United States Patent

[11] 3,573,341

[72] Inventors  Howard W. Graybill;
 Roy H. Albright, Greensburg, Pa.
[21] Appl. No. 809,889
[22] Filed Mar. 24, 1969
[45] Patented Apr. 6, 1971
[73] Assignee I-T-E Imperial Corporation
 Philadelphia, Pa.

[54] COMPRESSED-GAS INSULATED ELECTRICAL
 CONDUCTORS EMPLOYING EXPANDED TUBING
 COVER DESIGN
 11 Claims, 4 Drawing Figs.
[52] U.S. Cl. ..................................... 174/22,
 174/13, 174/28, 174/99
[51] Int. Cl. ........................................ H01b 9/06,
 H02g 15/24
[50] Field of Search .......................... 174/12, 13,
 21, 21.3, 21.4, 22, 22.2, 27, 28, 29, 88 (B), 99, 99
 (B), 99 (E), 111

[56] References Cited
 UNITED STATES PATENTS
2,355,111  8/1944  Rouault......................  174/28
2,498,589  2/1950  Steinke.....................  174/21(.3)UX
3,391,243  7/1968  Whitehead..................  174/28

FOREIGN PATENTS
822,848  11/1951  Germany..................  174/21(.3)

Primary Examiner—Laramie E. Askin
Attorney—Ostrolenk, Faber, Gerb & Soffen

ABSTRACT: A compressed insulated conductor system comprised of a substantially cylindrical-shaped metallic enclosure and a substantially cylindrical-shaped conductor positioned within the enclosure and held concentric therewith by means of annular-shaped insulating spacers arranged at spaced intervals within and along the interior of the enclosure. The enclosure is filled with a compressed gas such as, for example, $SF_6$. The spacers at opposite ends of each bus section are fixedly secured to the enclosure in such a manner as to seal the compressed gas within the interior of the enclosure. The enclosure at opposite ends thereof is so formed as to provide a bearing surface for one marginal edge of an end spacer, the opposite end of which is rigidly held in place by means of a duct cover end firmly secured within the enclosure and bearing against the second marginal surface of the end spacer. The spacer is provided with an annular-shaped groove around its exterior surface, which hollow space defined by the groove and the enclosure interior abutting thereagainst is filled with an epoxy material to firmly secure the spacer to the enclosure and to prevent any gaps between the adjacent surfaces of enclosure and end spacer, as well as preventing the escape of the compressed gas contained within the enclosure.

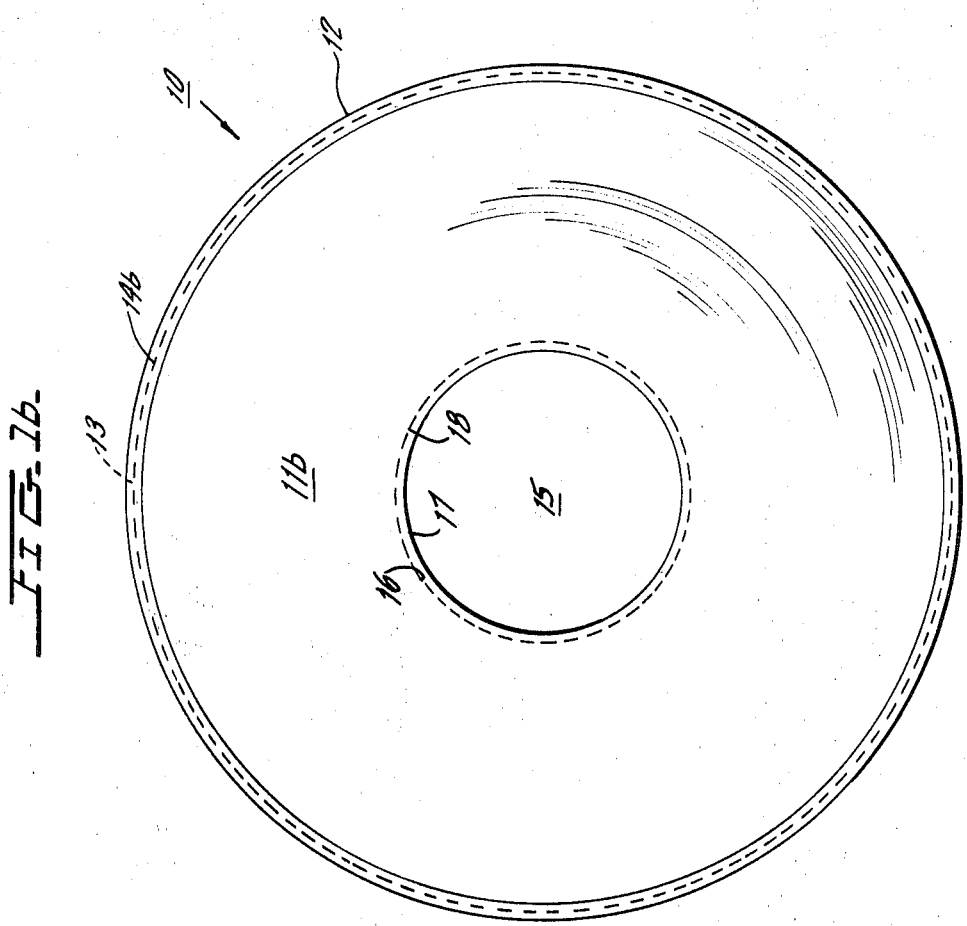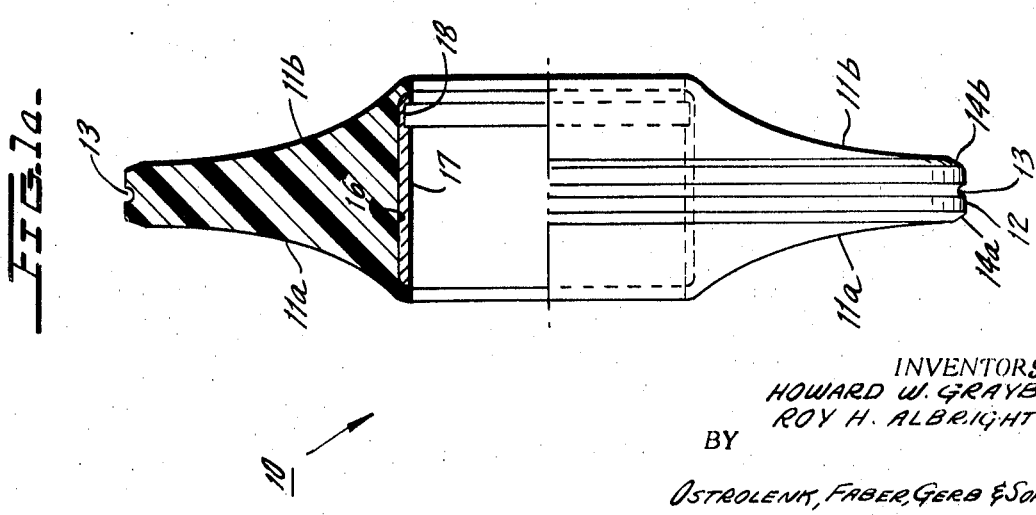

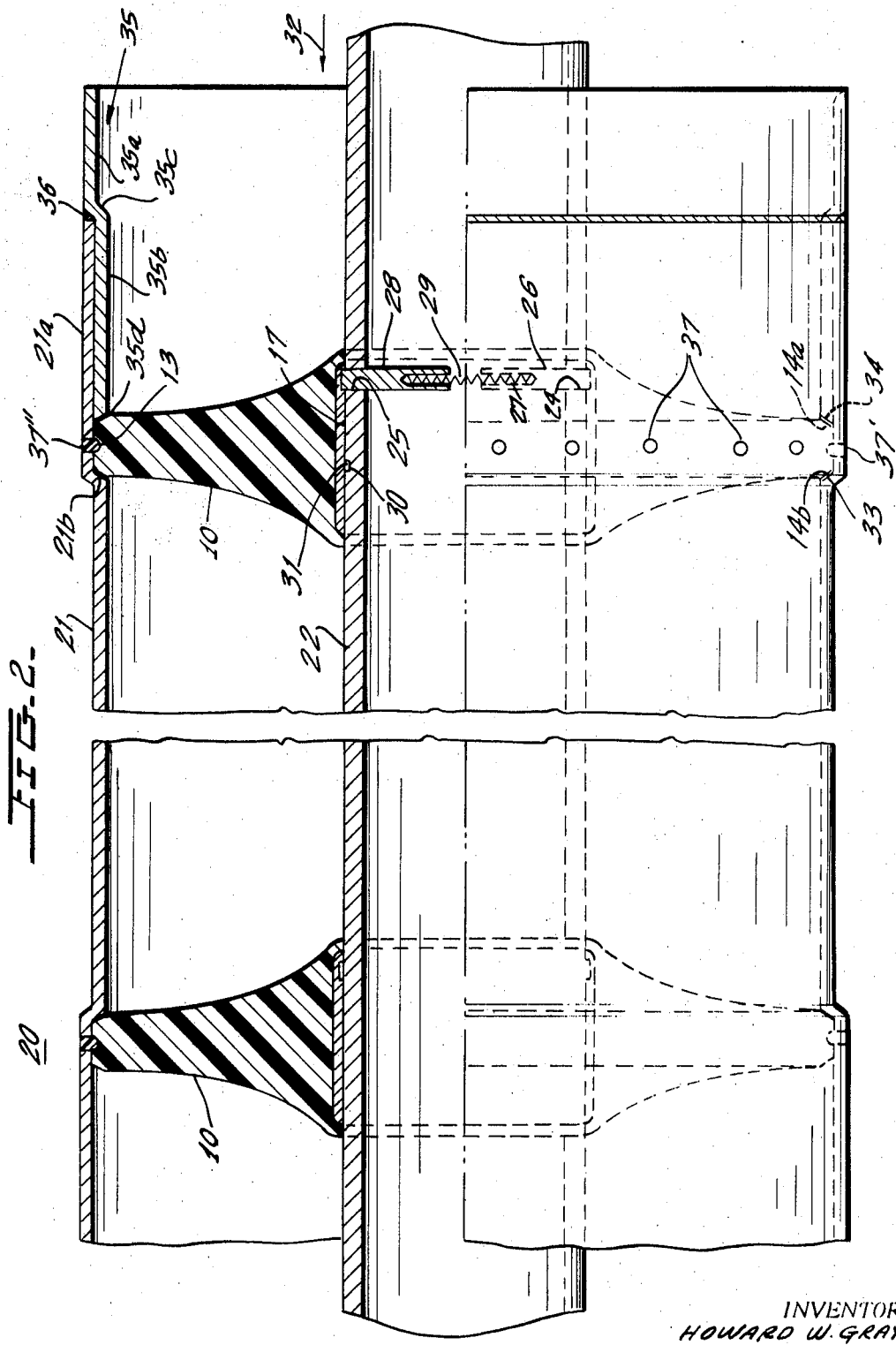

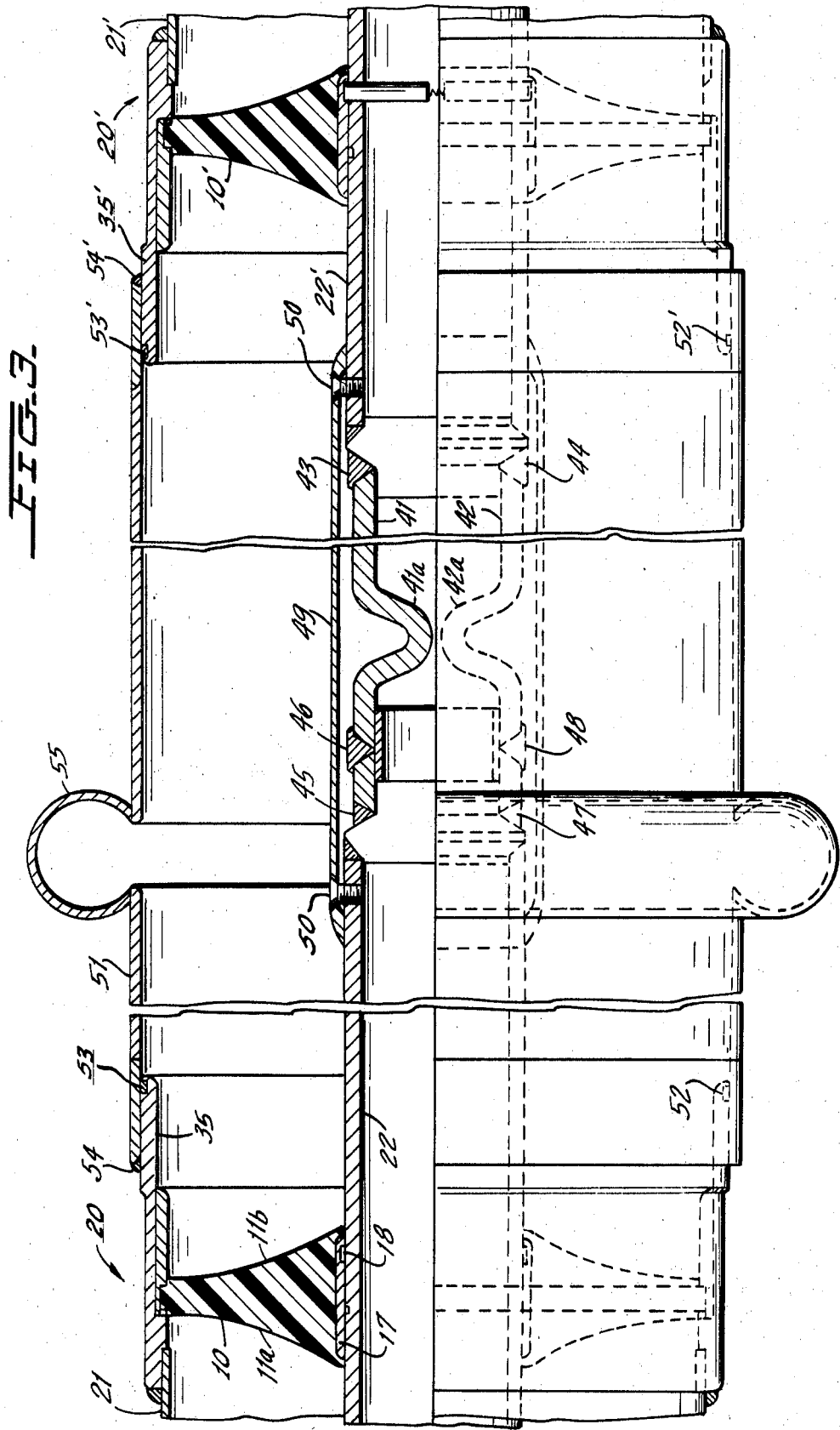

COMPRESSED-GAS INSULATED ELECTRICAL CONDUCTORS EMPLOYING EXPANDED TUBING COVER DESIGN

The present invention relates to compressed-gas insulated electrical conductors, and more particularly to a novel expanded tubing cover design for use in such enclosures to rigidly secure enclosure spacers within each enclosure section and to prevent the escape of compressed gas contained within the enclosure interior.

Compressed-gas insulated conductors are normally comprised of metal-enclosed high-voltage electrical conductors in which a metallic conductor, generally tubular, is centrally supported within a grounded metal tube of larger diameter by means of a solid disc or cone-shaped insulator. The metallic conductor is insulated from the enclosure tube by means of a compressed gas such as sulfur hexafluoride ($SF_6$). Such electrical conductors may be used as buses in electrical substations, or generating stations, or for transmission of electrical power over either short, intermediate or long distances. Such metal-enclosed high-voltage electrical conductors may be buried underground or supported at some convenient height above ground. The principal advantage of compressed-gas insulated buses, as compared with conventional open buses, is a tremendous reduction in the space requirements which such multiphase bus systems occupy. Whereas extra high voltage (EHV) buses of open construction in air normally require ground clearances of 8 to 15 feet and phase spacings of 15 to 25 feet, buses of the metal-enclosed compressed-gas type can be provided with ground clearances of as little as 4 to 10 inches and phase spacings of as little as 24 to 42 inches for the same voltage ratings. In addition thereto, the compressed-gas insulated bus having a grounded metal enclosure for each phase offers greater reliability and safety as compared with conventional open EHV conductors.

A considerable amount of research has been conducted in the field of compressed-gas insulated electrical conductors resulting in a few installations. All of the techniques used to date employ bolted and gasketed joints for the enclosure tubing. Enclosures are provided with flanges which are welded to individual sections of the tubing. Adjacent sections are bolted together by means of a multiplicity of bolts disposed around the flanges such that the axes of the bolts are substantially parallel to the axis of the conductor. Such joints between adjacent sections are usually arranged to be located at each support insulator which is provided to hold the conductor in a position concentric with the enclosure tubing. Gaskets are used to prevent the gas from leaking out into the atmosphere and are secured between the bolted flanges. Experience in the field has shown that gaskets, whether they are formed of cork or of various types of natural or synthetic rubber, are all subject to deterioration and tend to leak after some period of time. This tendency is accelerated by the temperature cycling of the bus system when in operation.

In cases where detection of gas leakage is noted before there is too great a drop in pressure within the bus, the replacement of the gas (such as $SF_6$) is quite costly. In cases where the pressure drop is great, a power flashover may occur due to the decrease in dielectric strength of the gas as a result of the decrease in pressure.

The present invention is characterized by providing a compressed-gas bus assembly which simplifies field installation while, at the same time, providing excellent protection against gas leakage through the use of a novel spacer sealing arrangement which eliminates any leakage of gas from within the enclosure interior.

The present invention is comprised of a compressed-gas bus assembly including an enclosure and a concentrically mounted tubular-shaped conductor firmly positioned within the enclosure by means of disc-shaped spacers arranged at spaced intervals along each enclosure section. Preferably, at least three such spacers are provided for each enclosure section, one each being arranged near the ends thereof while at least one remaining spacer is provided intermediate the ends of the section. The spacers arranged near the ends of each enclosure section have one marginal surface thereof abutting a continuous shoulder provided within the interior of the enclosure. The spacer is firmly urged against the enclosure shoulder by means of a retaining tube inserted into the duct cover at each end thereof and of slightly smaller outer diameter than the inner diameter of the duct cover. The innermost marginal edge of the retainer tube bears against the duct cover, urging it firmly against the shoulder formed within the enclosure.

The insulating spacer is further provided with an annular groove surrounding the outer periphery of the spacer which is aligned with openings arranged at spaced intervals around the duct cover for the insertion of a suitable sealant. A sealant such as, for example, an unfilled epoxy resin is forced into the groove provided in the insulating spacer so as to fill any void in this space and completely seal the region between the insulating spacer and the interior surface of the duct cover which is immediately adjacent the outer surface of the insulating spacer. Fastening means are inserted in each of the openings employed for injecting the sealant into the enclosure, and these fastening means are preferably welded after being suitably tightened to provide an excellent seal protecting against the escape of compressed gas from the enclosure section. The retaining tube is preferably welded to the duct cover to firmly maintain the insulating spacer in bearing relationship against the shoulder of the duct cover. Gaskets are preferably provided in the region between the marginal edges of the insulating spacer and the duct cover shoulder and marginal edge of the retaining tube to enhance the sealing properties of the enclosure section as well as to restrain the flow of sealant to the region of the marginal surface of the insulating spacer.

The interior annular surface of the insulating spacer is provided with a gasket inserted within an annular-shaped groove provided in the concentrically mounted conductor to prevent the passage of gas between the insulating spacer and the tubular conductor.

Formation of enclosure sections in the manner described above allows for accurate testing of the enclosure sections when filled with compressed gas prior to shipment to the installation site. Adjacent sections of the bus assemblies are joined together in the field by means of an enclosure cover section which is telescoped over adjacent sections and welded thereto to provide a good seal along the bus run. Since the insulating spacers have already been mounted in place in the factory, the field installation is greatly simplified, requiring only a welding operation of the enclosure cover to adjacent sections of bus. In addition to preventing leakage of gas between the interior surface of the enclosure and the outer peripheral surface of the insulating spacer, the filling of any gap between these two elements further protects against the development of any corona in that area to further enhance the reliability and safety of the system.

It is, therefore, one object of the present invention to provide a joint for gas-compressed bus assemblies which does not require the use of any gaskets and which is not subject to leakage from the interior to the exterior of the enclosure.

Still another object of the present invention is to provide a means for rigidly mounting a bus support insulator within the enclosure joint of a compressed-gas insulated conductor system to prevent the leakage of compressed gas around the insulated spacer.

A third object of the present invention is to provide a novel compressed-gas insulated conductor system which is provided with a gas stopper seal between the adjacent sections of an enclosure on either side of the bus support insulator.

Still another object of the present invention is to provide a low-cost means of joining adjacent enclosure sections and of mounting bus support insulators at the joint of such sections in systems of the compressed-gas insulated conductor type.

Yet another object of the present invention is to provide means for preventing contaminants, especially metallic particles, from entering into the enclosure of a compressed-gas insulated conductor system during the final joining process.

These as well as other objects of the present invention will become apparent when reading the accompanying description and drawings in which:

FIG. 1a is an end view partially sectionalized of a disc insulator which may be employed to great advantage in the present invention.

FIG. 1b is a side view of the disc insulator of FIG. 1a.

FIG. 2 shows an elevational view partially sectionalized of an enclosure section employing insulating spacers of the type shown in FIGS. 1a and 1b.

FIG. 3 is a sectional elevational view showing the manner in which two enclosure sections of the type shown in FIG. 2 are jointed together.

FIGS. 1a and 1b show an insulating spacer 10 of the type employed to great advantage in the present invention. The insulating spacer 10 is generally disc-shaped. The radial surfaces of the disc insulator have a generally curved surface, as shown at 11a and 11b, wherein the thickness of the insulator is widest toward the center thereof, tapering to a narrower thickness at the extreme outer periphery of the insulator. The outer periphery 12 is a substantially flat, continuous surface surrounding the entire insulator, and is provided with a centrally located groove 13 surrounding the entire periphery. The surface 12 joins the curved surfaces 11a and 11b of the spacer by means of diagonally aligned or beveled surfaces 14a and 14b which are employed as bearing surfaces in a manner to be more fully described. The insulator is preferably formed of an epoxy, but may be formed of any suitable insulating material compatible within the requirements of extra high-voltage installations.

The spacer is provided with a centrally located opening 15 which provides for the passage of the tubular conductor therethrough in a manner to be more fully described. The interior periphery of the spacer surface defining opening 15 is further provided with an annular-shaped continuous recess 16 which receives and firmly holds a metallic conductive ring 17 therein. The ring 17 is continuous and occupies the entire region of the recess 16. Ring 17 is further provided with a substantially square-shaped recess 18 for receiving and seating locking plungers (to be more fully described) provided within the tubular conductor for fixedly securing the insulating spacer along the tubular conductor and for preventing any relative movement between the insulating spacer and the conductor. The metallic conductive ring 17 prevents the formation of any corona between insulating spacer 10 and the tubular conductor which it supports (see FIG. 2) to prevent the formation of any corona between the insulating spacer and the tubular conductor.

FIG. 2 shows a typical enclosure section employing insulating spacers of the type shown in FIGS. 1a and 1b. The compressed-gas insulated conductor section 20 of FIG. 2 is comprised of an elongated, substantially tubular-shaped conductive enclosure 21 surrounding a hollow tubular conductor 22 which is maintained in a position concentric with enclosure 21 by means of the spacers 10,10 provided at opposite ends of the insulated conductor section.

Since the manner in which the left and right-hand spacers 10,10 are secured near the ends of enclosure section 21 and are substantially identical, a description of only the right-hand spacer assembly will be given herein for purposes of simplicity, it being understood that the left-hand spacer assembly is substantially identical in both configuration and function.

It can be seen that the enclosure section 21 is provided near its right-hand end with an enlarged diameter section 21a joining the intermediate section 21 by means of a shoulder 21b. The right-hand end insulating spacer 10 is mounted upon the tubular conductor 22 which is telescoped through the central opening 15 of the spacer. Tubular conductor 22 is provided with a pair of openings 24 and 25, which openings have their centers lying along imaginary line 26 which is colinear with the diameter of tubular conductor 22. A pair of plungers 27 and 28 are positioned within the interior of tubular conductor 22 and are urged outwardly to project out of the openings 24 and 25, respectively, under the force of a compression spring 29. The plungers firmly lock the spacer 10 to tubular conductor 22 in the following manner:

After the plungers 27 and 28 and compression spring 29 are mounted into the tubular 22, they are urged toward one another to permit the insulating spacer 10 to be slid freely over the openings 24 and 25. The plungers 27 and 28 are then released and the spacer 10 is slid toward the left until the recess 18 is positioned immediately above the openings 24 and 25. At this time, the plungers 27 and 28 "snap" outwardly and enter into recess 18. The plungers are maintained in their outermost position seated in recess 18 under the force of compression spring 29, preventing any relative linear motion between insulating spacer 10 and tubular conductor 22.

Tubular conductor 22 is further provided with a groove 30 continuously surrounding the gasket 31. Gasket 31 firmly bears against the interior surface of conductive ring 17 to prevent the leakage or passage of compressed gas past the gasket in either direction. Once the insulating spacer 10 is adequately secured to the tubular conductor, the tubular conductor 22 is inserted into enclosure 21 in the direction shown by arrow 32. A ring-shaped gasket 33 is positioned along the beveled edge 14b of insulating spacer 10, and is compressed between the beveled edge 14b and the shoulder 21b of enclosure 21 as the tubular conductor 22 is firmly urged into enclosure 21. The gasket is preferably coated on both surfaces thereof with an unfilled epoxy resin prior to being pressed into place against the shoulder of the duct cover. A second gasket 34 substantially identical to gasket 33 is similarly coated on both surfaces thereof with an unfilled epoxy, and is pressed into place against the bevel 14a provided around the periphery of insulating spacer 10.

A duct cover end 35 which is comprised of an enlarged diameter section 35a joined to a reduced diameter section 35b by means of a shoulder 35c, is telescoped into the right-hand end of enclosure 21 in the manner shown in FIG. 2 so that its extreme left-hand edge 35d firmly bears against the coated gasket 34. Sufficient pressure is applied to the duct cover end 35 to compress the gaskets 33 and 34 and thereby firmly secure the insulating spacer 10 between the shoulder 21b of enclosure 21 and the extreme edge 35d of duct cover end 35. While this pressure is being maintained, the duct cover end 35 is tack-welded to enclosure 21 in the region 36 of shoulder 35c so as to firmly maintain the duct cover end 35 in place when the holding pressure is released. The weld is then sealed and ground smooth to facilitate the application of the enclosure cover used to mount adjacent sections of enclosure in a manner to be more fully described.

A plurality of openings 37 are arranged at spaced intervals around enclosure 21 and are located immediately above the groove 13 (see also FIG. 1) provided in the insulating spacer 10. These openings 37 immediately overlie the groove 13 when gaskets 33 and 34 are in the compressive state. The hollow region defined by continuous groove 13 and the adjacent interior wall of enclosure 21 is completely filled by injecting an unfilled epoxy resin under suitable force into the hollow space through the openings 37. In order to insure the fact that the interior hollow space is filled, epoxy is inserted into the bottommost hole 37' through the use of a calking gun or compressed air until epoxy appears at the topmost hole 37''. The epoxy is prevented from spreading beyond the region of the hollow space by the compressed gaskets 33 and 34. After the epoxy is suitably injected, setscrews are inserted into each of the openings 37 (as well as 37' and 37''), which screws threadedly engage the threaded openings 37. Once the setscrews are firmly inserted into each opening, the enclosure is welded over the setscrews to firmly seal these openings.

As was previously described, the left-hand insulating spacer assembly 10 is secured in a similar manner.

Adjacent enclosure sections are secured to one another in the manner shown best in FIG. 3 which shows a portion of a left-hand bus section 20 and a portion of a right-hand bus section 20'. The end portions of the bus section 20 and 20' are somewhat modified as compared with the end sections shown in FIG. 2. However, of primary concern in the showing of FIG. 3 is the manner in which the telescoping section 51 is mounted upon the end sections. A flexible conductor assembly comprised of a pair of spaced parallel flexible conductor members 41 and 42 are secured at their right-hand ends to the left-hand end of tubular conductor 22' in any suitable manner such as, for example, by welding, which welds are shown at 43 and 44, respectively. Tubular conductor 22 extends a greater distance beyond its duct cover end 35 than tubular conductor 22' extends beyond its duct cover end 35'. The left-hand ends of conductive members 41 and 42 are coupled to the right-hand end of conductor 22 such as, for example, by welding at the locations 45, 46, 47 and 48. The bent portions 41a and 42a in conductors 41 and 42 are provided for the purpose of allowing for expansion and contraction of these conductors as well as conductors 22 and 22'. As was previously described, spacer member 10' is fixedly secured to tubular conductor 22'. However, the plunger assembly 27—29, shown in FIG. 2, is eliminated from the spacer assembly 10 to allow conductor 22 to move relative to spacer 10 to allow for expansion and contraction of tubular conductor 22 as it cycles during operation.

After the field welds 43 through 48 are completed, a cylindrical-shaped enclosure 49 is telescoped over the spaced parallel conductive members 41 and 42 as well as the field welds. Just prior to the field welding operation, the tubular enclosure 49 is positioned well to the left of the area being field welded, and is slid into the position shown in FIG. 3. Setscrews 50 are inserted into suitable tapped apertures provided in enclosure 49 to retain the enclosure 49 in the position shown in FIG. 3. Enclosure 49 provides a smooth conductive surface around the assembly which it surrounds to prevent the formation of corona.

The slide cover 51, which is preferably telescoped over the left-hand enclosure section which includes spacer assembly 10, is telescoped over this assembly to provide adequate room for working on the installation of conductors 41 and 42.

The duct cover end sections 35 and 35' are preferably provided with continuous annular-shaped grooves surrounding the exterior surface of the duct cover ends and designated by the numerals 52 and 52', respectively. These grooves receive gaskets 53 and 53', respectively, which act to seal the interior space enclosed by slide cover 51 when positioned as shown in FIG. 3.

The slide cover, when moved to the position shown in FIG. 3, is seal-welded at the locations 54 and 54' to completely seal the interior enclosed by the slide cover and to prevent the escape of any compressed gas from the interior of the structure. The gaskets 53 and 53' prevent metallic particles, gases, or other harmful elements from entering into the interior region of the slide cover after positioned in place. Once the field welds provided at the locations 54 and 54' are completed, the functions of the gaskets 53 and 53' have actually been terminated.

To allow for proper expansion and contraction of the enclosures 21 and 21', the central portion of slide cover 51 is provided with a toroidal-shaped enclosure section 55 which is partially opened and joined at the opening edges to slide cover 51, as shown in FIG. 3, to allow for expansion and contraction of the enclosures 21 and 21' as well as the sections of the slide cover 51 lying to the left and right of the toroidal-shaped enclosure section 55.

It can clearly be seen from FIG. 3 that the field installation of adjacent enclosure sections is completely independent of the installation of the insulating spacers which are fully installed into position in the factory, thereby completely avoiding the need for sealing the insulating spacers in the field and thereby reducing the number of installation activities which are performed in the field. In addition to the above advantage, each compressed-gas conductor section may be completely and thoroughly tested to establish their leakproof characteristics prior to shipment into the field, still further reducing field installation time and complexity.

Although this invention has been described with respect to particular embodiments, it should be understood that many variations and modifications will now be obvious to those skilled in the art, and, therefore, the scope of this invention is limited not by the specific disclosure herein, but only by the appended claims.

We claim:

1. A bus assembly comprising:
an annular-shaped conductive enclosure;
an annular-shaped conductor positioned within said enclosure; and spacer means positioning and maintaining said conductor within said enclosure;
said spacer means comprising an annular shaped member formed of insulating material having a central opening receiving said conductor and having a peripheral edge engaging the interior surface of said enclosure;
a continuous groove being provided along said peripheral edge;
the hollow space defined by said groove and the interior surface of said enclosure being filled with an epoxy material to prevent the passage of any gas through the above mentioned hollow space;
said enclosure being provided with an integrally formed enlarged section at one end thereof with said section forming a continuous shoulder along the interior of said enclosure with the remaining portion of the enclosure;
said peripheral edge being positioned to abut against said shoulder; and
an annular-shaped enclosure cover section being telescoped within and secured to said one end of the enclosure, the end of said cover section projecting into said enclosure bearing against said peripheral edge to urge said peripheral edge against said shoulder and thereby rigidly maintain said peripheral edge in bearing relationship with the end of said cover section and said shoulder.

2. The assembly of claim 1 further comprising first and second gaskets;
said first gasket being positioned between said peripheral edge and the end of said cover section;
said second gasket being positioned between said peripheral edge and said shoulder; and
said first and second gaskets cooperating to confine said epoxy to the immediate region of said continuous groove.

3. A bus system comprised of:
plural bus assemblies of the type described in claim 1, said assemblies being aligned end to end;
an annular-shaped assembly-joining enclosure being telescoped about and secured to cover sections of adjacent bus assemblies;
said assembly-joining enclosure being provided with a yieldable section located intermediate its ends to allow for normal expansion and contraction of the system;
a central conductive member connected to facing ends of the bus assemblies being joined; and
said central conductive member being positioned within said assembly-joining enclosure and having a yieldable central section adapted to allow for normal expansion and contraction of the bus system.

4. The assembly of claim 1 wherein:
said enclosure is provided with a plurality of openings arranged at spaced intervals along an imaginary line surrounding the enclosure and aligned with said continuous groove;
said openings receiving said epoxy for filling the said hollow space; and
threaded fastening means each being threadedly positioned within an associated opening sealing said enclosure after injection of said epoxy.

5. A bus assembly comprising:
an annular-shaped conductive enclosure;
an annular-shaped conductor positioned within said enclosure; and spacer means positioning and maintaining said conductor within said enclosure;

said spacer means comprising an annular-shaped member formed of insulating material having a central opening receiving said conductor and having a peripheral edge engaging the interior surface of said enclosure;

said enclosure being provided with an integrally formed enlarged section at one end thereof with said section forming a continuous shoulder along the interior of said enclosure with the remaining portion of the enclosure;

the peripheral edge of said spacer being positioned to abut against said shoulder; and an annular-shaped enclosure cover section being telescoped within and secured to said one end of the enclosure, the end of said cover section projecting into said enclosure bearing against the peripheral edge of said spacer to urge said peripheral edge against said shoulder and thereby rigidly maintain said peripheral edge in bearing relationship with the end of said cover section and said shoulder.

6. A bus system comprised of:

plural bus assemblies of the type described in claim 5, said assemblies being aligned end to end;

an annular-shaped assembly-joining enclosure being telescoped about and secured to cover sections of adjacent bus assemblies;

said assembly-joining enclosure being provided with a yieldable section located intermediate its ends to allow for normal expansion and contraction of the system;

a central conductive member connected to facing ends of the bus assemblies being joined; and said central conductive member being positioned within said assembly-joining enclosure and having a yieldable central section adapted to allow for normal expansion and contraction of the bus system.

7. The assembly of claim 5 wherein said annular-shaped member is provided with a tapered configuration along each of its opposite faces which join the peripheral edge to the central opening such that the member decreases in thickness from said central opening toward said peripheral edge.

8. The assembly of claim 5 further comprising a metallic ring positioned within the central opening of said annular-shaped member and engaging said conductor.

9. The assembly of claim 8 wherein:

said metallic ring is provided with a pair of cavities arranged on opposite sides of said ring;

said conductor having a pair of openings each aligned with one of said cavities;

a pair of metallic pins being coaxially aligned, each pin being positioned to pass through an associated one of said conductor openings and rest in one of said cavities; and bias means positioned between the facing ends of said pins to urge said pins toward their associated cavities and thereby lock said spacer member to said conductor.

10. The assembly of claim 5 wherein the interior space defined by said enclosure is filled with a compressed gas.

11. The assembly of claim 10 wherein said compressed gas is sulfur hexafluoride.